(12) United States Patent
Krumpholz

(10) Patent No.: US 10,971,997 B2
(45) Date of Patent: Apr. 6, 2021

(54) BURST MODE ROUTINE FOR SWITCHED MODE POWER CONVERTER

(71) Applicant: DELTA ELECTRONICS (THAILAND) PUBLIC CO., LTD., Samutprakarn (TH)

(72) Inventor: Christian Krumpholz, Freiburg (DE)

(73) Assignee: DELTA ELECTRONICS (THAILAND) PUBLIC CO., LTD, Samutprakarn (TH)

( * ) Notice: Subject to any disclaimer, the term of this patent is extended or adjusted under 35 U.S.C. 154(b) by 15 days.

(21) Appl. No.: 16/690,549

(22) Filed: Nov. 21, 2019

(65) Prior Publication Data

US 2020/0204063 A1    Jun. 25, 2020

(30) Foreign Application Priority Data

Dec. 14, 2018  (EP) .................................... 18212766

(51) Int. Cl.
*H02M 1/42*     (2007.01)
*H02M 7/06*     (2006.01)
*H02M 7/44*     (2006.01)
*H02M 1/00*     (2006.01)

(52) U.S. Cl.
CPC .............. *H02M 1/42* (2013.01); *H02M 7/06* (2013.01); *H02M 7/44* (2013.01); *H02M 2001/0009* (2013.01); *H02M 2001/0035* (2013.01); *H02M 2001/0048* (2013.01)

(58) Field of Classification Search
CPC ............ H02M 1/42; H02M 7/06; H02M 7/44; H02M 2001/0009; H02M 2001/0035; H02M 2001/0048
See application file for complete search history.

(56) References Cited

U.S. PATENT DOCUMENTS

| | | |
|---|---|---|
| 4,937,728 A | 6/1990 | Leonardi |
| 8,222,772 B1 | 7/2012 | Vinciarelli |
| 8,836,296 B2 * | 9/2014 | Iwabuki .................. H02M 7/06 323/266 |

(Continued)

OTHER PUBLICATIONS

NCP1611, "Enhanced, High-Efficiency Power Factor Controller", Jan. 2015—Rev. 4, pp. 1-29.
European Search Report dated Jul. 10, 2019, 9 pages.

*Primary Examiner* — Adolf D Berhane
*Assistant Examiner* — Afework S Demisse
(74) *Attorney, Agent, or Firm* — Vector IP Law Group LLC; Robert S. Babayi

(57) ABSTRACT

A method for providing an output power of a switched mode power converter comprises the steps of determining a block length and, if a set value of the output power is below a first power threshold, preventing a power flow through the converter in each period of the multiphase AC voltage for at least one blocking interval. Each blocking interval has a duration of one block length. The switched mode power converter has a multiphase AC side with a number N of conductors for receiving a multiphase AC voltage. The number N of conductors is at least three. Power flows into the switched mode power converter through a combination of current-carrying conductors. The block length is defined by a time span between two subsequent changes of the combination of the current-carrying conductors.

16 Claims, 4 Drawing Sheets

(56) References Cited

U.S. PATENT DOCUMENTS

| | | |
|---|---|---|
| 2002/0125863 A1 | 9/2002 | Lin et al. |
| 2009/0016087 A1* | 1/2009 | Shimizu .............. H02M 1/4225 363/89 |
| 2011/0211375 A1* | 9/2011 | Uno .................... H02M 1/4225 363/74 |
| 2013/0235626 A1 | 9/2013 | Jang et al. |

* cited by examiner 15.2 15.1 15.3

BURST MODE ROUTINE FOR SWITCHED MODE POWER CONVERTER

TECHNICAL FIELD

The invention relates to a method for providing an output power of a switched mode power converter with a multiphase AC side. The invention relates further to a controller for carrying out the method, to a power converter which uses the method and to an inverter which uses the method.

BACKGROUND ART

The US 2013/0235626 A1 (Delta) discloses several control schemes to achieve soft switching while regulating the output voltage of a PFC rectifier.

The burst lengths of this scheme are not chosen based on the input current waveform.

U.S. Pat. No. 8,222,772 (VI Chip) discloses to perform a power factor correction at high loads and an on-demand burst mode at low loads. At low loads, the controller may adjust the phase angle of the operating interval relative to the unipolar input towards centering the operating interval about a peak in the pulse waveform.

The burst lengths are not chosen based on the input current waveform, only the placement of the bursts depends on the input current waveform.

U.S. Pat. No. 4,937,728 (Leonardi) discloses a single phase switched mode power supply with a burst mode synchronized to the frequency of the utility line, the length of each burst being essentially fixed to correspond to ¼ of each AC utility line cycle according to U.S. Pat. No. 8,222,772 (VI Chip).

The burst length does not depend on the duration between two subsequent changes in the current-carrying conductors.

US 2002/0125863 (Lin et al.) discloses a method to regulate the power of a plurality of loads using a plurality of phased burst signals. A constant or variable phase delay is generated between each phased burst mode signal. One application is regulating circuits for a plurality of cold cathode fluorescent lamps. In this document, the burst length is chosen to regulate the transmitted power.

The burst lengths are not chosen based on the input current waveform.

If the input current does not correspond to the input voltage, the often required power factor correction cannot be realized. Therefore a high switching frequency is often used with the consequence that the known burst mode routines may lead to audible noise or a ringing of the input filters of the power supply.

SUMMARY OF THE INVENTION

It is the object of the invention to create a burst mode routine for switched mode power converters that can be used with a power factor correction circuit in order to reduce losses during low load conditions. Depending on the requirements at hand, the inventive routine avoids subharmonics in the resulting current or voltage signals or balances the current between all involved phases. The routine reduces noise or ringing problems.

The solution of the invention is specified by the features of claim 1. According to the invention the method for providing an output power of a switched mode power converter comprises the steps of:

a. determining a block length
b. and, if a set value of the output power is below a first power threshold, preventing a power flow through the converter in each period of the multiphase AC voltage for at least one blocking interval.

A block length is defined by a time span between two subsequent changes of the combination of the current-carrying conductors. A blocking interval has a duration of one block length.

The switched mode power converter has a multiphase AC side. The multiphase AC side has a number N of conductors for receiving a multiphase AC voltage. The number N of conductors for receiving the multiphase AC side is at least three. The power flows into the converter through a combination of current-carrying conductors.

A burst is the time span during which power flows through the converter. Bursts are separated by blocking intervals. The duration of a blocking interval is the block length and depends on the multiphase AC voltage.

A change of the combination of current-carrying conductors occurs if the current runs either through at least one conductor which was not present in the previous combination or if the current runs through the same conductors as before but changes its direction in at least two of the conductors.

The multiphase AC voltage comprises a number of phases. Preferably, all of these phases have essentially the same amplitude and period and a sinusoidal waveform. The phase shift between two subsequent phases is preferably the same for all phases and equals essentially 360° divided by the number of phases.

With such a multiphase AC voltage and assuming that the circuitry is such that phases with minimal phase shift are connected to each other or that all phases are connected to a neutral conductor, the combination of the current-carrying conductors changes every 360°/(2M) if the number M of phases is uneven. If the number M of phases is even, the combination of the current-carrying conductors changes every 360°/M.

In the following we denote a combination of two current-carrying conductors as sequence of two letters, the first letter indicating the phase with the higher voltage potential.

In a first example, we assume that there are three conductors and all conductors are phase conductors P, Q and R. The phases are shifted by 120° with respect to each other. In this case M=3 and N=3.

| Phase angle interval | Combination of current-carrying conductors |
|---|---|
| 0° to 60° | PR |
| 60° to 120° | PQ |
| 120° to 180° | RQ |
| 180° to 240° | RP |
| 240° to 320° | QP |
| 320° to 360° | QR |

Consequently the time span between two subsequent changes of the combination of current-carrying conductors is therefore always 60°, if expressed in phase angle units, or ⅙ of the period of the AC voltage if expressed in time units.

In a second example, we assume that there are three conductors and two of them are phase conductors P, Q while one is a neutral conductors N. The phases are shifted by 180° with respect to each other. In this case M=2 and N=3.

| Phase angle interval | Combination of current-carrying conductors |
| --- | --- |
| 0°≤ to 180° | PN and NQ |
| 180° to 360° | NP and QN |

The time span between two subsequent changes of the combination of current-carrying conductors is therefore always 180°, if expressed in phase angle units, or ½ of the period of the AC voltage if expressed in time units.

In a third example, we assume that there are four conductors which are all phase conductors P, Q, R and S. The phases are shifted by 90° with respect to each other. In this case N=4 and M=4.

| Phase angle interval | Combination of current-carrying conductors |
| --- | --- |
| 0°≤ to 90° | QR and PS |
| 90° to 180° | SR and PQ |
| 180° to 270° | RQ and SP |
| 270° to 360° | RS and QP |

The time span between two subsequent changes of the combination of current-carrying conductors is therefore always 90°, if expressed in phase angle units, or ¼ of the period of the AC voltage if expressed in time units.

In a forth example, we assume that there are four conductors of which three are phase conductors P, Q, R and one is a neutral conductor N. The phases are shifted by 120° with respect to each other. In this case M=3 and N=4.

| Phase angle interval | Combination of current-carrying conductors |
| --- | --- |
| 0° to 60° | NR |
| 60° to 120° | PN |
| 120° to 180° | NQ |
| 180° to 240° | RN |
| 240° to 300° | NP |
| 300° to 360° | QN |

The time span between two subsequent changes of the combination of current-carrying conductors is therefore always 60°, if expressed in phase angle units, or ⅙ of the period of the AC voltage if expressed in time units.

Here and in the following, time spans and durations and points in time can be expressed in phase angles as well as in time units unless otherwise stated. If not explicitly mentioned otherwise, the phase angle is the phase angle of the multiphase AC voltage.

Conductors can be phase conductors or neutral conductors, but there is always only one neutral conductor.

The block length shall be determined in a state where the output power is above the first power threshold and therefore in a situation where the power flow is not blocked.

The term "determining" should be interpreted to include but not being limited to measuring, calculating, building the device such that the values is known in advance or using the device in situations where the value is known. It is also possible that the device is constructed in such a way that a blocking interval has the duration of one block length built-in.

The period of the AC voltage can be determined by measuring or monitoring the multiphase AC current, the multiphase AC voltage, the multiphase AC power or it can be given by the net provider or the AC voltage provider.

Choosing long blocking intervals results in lower frequencies compared to the one known in the prior art. This moves possible noise emissions to frequencies where the human ear is less sensitive, therefore reducing the hearable noise. Also, a multiphase AC power dependent block length has the advantage that it is possible to balance the current between all involved phases.

In one embodiment the block length is determined by dividing a duration of a period of the multiphase AC voltage by a bump-number C. The bump-number C is the number of changes of the combination of the current-carrying conductors which occur during one period of the multiphase AC voltage while the set value of the output power is above the first power threshold.

In other embodiments, the block length is determined by detecting changes of the combination of the current-carrying conductors and measuring the time in-between. This time measurement is not restricted to a measurement in time units but it can also be done by filling a reservoir with something, e.g. loading a capacitor with charges, building up a potential or similar methods.

In the case of sinusoidal waveforms of the voltages which are equally spaced over the 360° phase angle interval, the bump number C is 2M if the number M of phases is uneven and it equals M if the number M of phases is even.

In one embodiment, a separation between two blocking intervals is an integer multiple of the block length.

The integer can be zero or any positive number up to the number of changes of combination of the current-carrying conductors minus one. According to this embodiment the beginning of the period of the multiphase AC voltage can be chosen such that the 360° are essentially completely filled with blocking intervals and burst intervals.

A burst interval is an interval with a duration of one block length during which a power flow through the converter is possible even if the set value of the output power is below a first power threshold.

The block length times the sum of the number of burst and block intervals of one multiphase AC voltage period equals in this embodiment therefore the period of the multiphase AC voltage.

It is possible that two block intervals follow each other immediately. This is the case if the integer equals zero.

In one embodiment, every blocking interval starts at a point in time at which a change of the combination of the current-carrying conductors occurs.

Because of the duration of a blocking interval being equal to the time span between two changes of the combination of current-carrying conductors, this results in preventing a power flow from one combination of current-carrying conductors in this AC voltage period if the output power is below the first power threshold.

This allows to choose precisely the phases from which power is taken and therefore the currents can be balanced between the phases, if this is desired. Also, if the prevention of the power flow is realized with the help of switches, the voltage and current at the switching moment is the lowest occurring voltage and current. This reduces the requirements on the switches and increases their lifetime.

Further, the change of the combination of current-carrying conductors can easily be detected. For example the current flowing through a suitable choice of conductors can be monitored. In the case of three phase conductors the currents or voltages in two out of three phase conductors could be measured for this purpose. Finally, this embodiment has the advantage that, if switches placed on the conductors are used to prevent the power flow through the converter, the switching can happen before the expected change of the current-carrying conductors: As in many cases at least one of the conductors was not current-carrying before the change, opening a switch in this conductors does not influence the waveform at the output before the expected change.

In another embodiment, each blocking interval starts at a point in time at which a combined voltage function crosses a voltage threshold in a predefined direction.

The combined voltage function $V_{tot}(t)$ is the largest absolute value of a voltage between any two conductors which are connected with each other during at least one phase angle interval if the set value of the output power is above the first power threshold.

Conductors are preferably connected to each other if there is a current path between them which allows a current to flow from one of the conductors to the other in at least one direction. If there is a switch in this current path, the conductors are connected in the sense of the invention if this switch is closed for some phase angle interval if the set value of the output power is above the first power threshold.

The combined voltage function $V_{tot}(t)$ is in the case of the connectors being connected in a star connection, at every point in time the maximum absolute value of all voltages occurring in one of the connectors.

In the case of the connectors being connected in a polygon connection, the combined voltage function is the maximum absolute value of the voltage difference between all pairs of connectors with voltages having a fixed phase angle difference.

Here and in the following, a polygon connection should be understood as a connection in which phases with a given phase angle difference are connected to each other. Direct connections between phases with other phase angle differences should not occur.

For example in the case of four phases, denoted with P, Q, R and S, having voltages $V_P(t)=V_o \sin(t)$, $V_Q(t)=V_o \sin(t+90°)$, $V_R(t)=V_o \sin(t+180°)$, $V_S(t)=V_o \sin(t+270°)$, the combined voltage function is the following:

$V_{tot}(t)=\text{Max}(|V_P(t)|,|V_Q(t)|,|V_R(t)|,|V_S(t)|)$, if the phases are connected in a star connection.

$V_{tot}(t)=\text{Max}(|V_P(t)-V_Q(t)|,|V_Q(t)-V_R(t)|,|V_R(t)-V_S(t)|,|V_S(t)-V_P(t)|)$, if the phases are connected in a polygon connection with 90° phase angle difference.

$V_{tot}(t)=\text{Max}(|V_P(t)-V_R(t)|,|V_Q(t)-V_S(t)|)$, if the phases are connected in a polygon connection with 180° phase angle difference.

According to the definition of "polygon connection", there are for example two possible polygon connections in the case of the four phases P, Q, R, S described above: If the connections are between P and Q, Q and R, R and S and S and P, the phase difference between the connected phases is 90°. If P and R are connected and Q and S, the phase difference between the connected phases is 180°.

If every phase is connected with every other phase, the resulting combined voltage function is the same as in the case of a polygon connection with the largest possible phase angle difference.

In the example with the four phases P, Q, R and S and connections P-Q, P-R, P-S, Q-R, Q-S and R-S, the largest absolute value of the voltage difference will be in the connections P-R and Q-S which have the 180° phase difference. Consequently, the combined voltage function is the same as in the case of a polygon connection with 180° phase difference.

The combined voltage function has a period which equals the block length. Therefore, starting blocking intervals at points of time where the combined voltage function crosses a given voltage threshold in a given direction results in a regular pattern with which either the amount of subharmonics or the current balance between the different phases can be controlled.

In one embodiment, there is a second power threshold which is lower than the first power threshold. The method according to this embodiment comprises the following, additional steps:

If the set value of the output power is below the second power threshold, a number of blocking intervals per period of the AC voltage is chosen to be greater than the number of blocking intervals per period of the multiphase AC voltage in a case where the set value of the output power is between the second and the first power threshold.

If the set value of the output power is above the first power threshold, the number of blocking intervals per period of the AC voltage is chosen to be zero.

Preferably, the number of blocking intervals per period of the multiphase AC voltage is set to two, if the set value of the output power is below the second power threshold. And the number of blocking intervals per period of the AC voltage is set to one, if the set value of the output power is between the second power threshold and the first power threshold.

In a preferred embodiment, there are exactly three conductors for receiving a multiphase AC voltage and there are exactly three phases (N=M=3) and in this embodiment the number of blocking intervals per period of the multiphase AC voltage is set to two, if the set value of the output power is below the second power threshold and the number of blocking intervals per period of the AC voltage is set to one, if the set value of the output power is between the second power threshold and the first power threshold.

By increasing the number of blocking intervals with decreasing set values of the output power, the converter arrangement can be adapted to different low-load conditions. Thereby the efficiency of the converter arrangement can stay high even with low output loads.

According to one embodiment, the first power threshold is set to (C−1)/C times the maximum power obtainable with a given connection of the conductors. C is the bump number as defined above.

Preferably, the second power threshold is set to (C−2)/C times the maximum power obtainable with a given connection of the conductors. C is the bump number as defined above.

The maximum power obtainable with a given connection of the conductors and with a given output current depends on the phase angle difference between the connected conductors: The voltages increase with increasing phase angle difference. The choice of the connection of the conductors determines the possible phase angle differences. For example, the connection of the conductors can be a star connection, a delta connection or a polygon connection.

There are two ways to reduce the output power in a converter arrangement: On the one hand, the output current can be reduced and on the other hand, blocking intervals can be introduced which block the power transmission during the duration of one block length. Working with reduced currents tends to decrease the efficiency of the power supply. Therefore the use of blocking intervals is preferred. However, blocking intervals reduce the transmitted power in discrete steps. Having C bumps, there is obviously no power transmitted if there are C blocking intervals per period of the AC voltage. A single blocking interval reduces the transmitted power by 1/C times the power transmitted with the same current but without any blocking interval. In order to change the current values as little as possible, it is therefore preferred to set the first power threshold to (C−1)/C of the maximum transmittable power. The interval in which the current needs to be varied to obtain a power transmission between the maximum and (C−1)/C of the maximum power is thereby only [(C−1)/C, 1] in units of the maximum current and assuming a constant voltage amplitude.

According to one embodiment, all the conductors of the multiphase AC side are connected to phases of the multiphase AC voltage such that a polygon connection results and the method comprises the step of choosing a phase difference multiple k out of the integers between and including one and the integer quotient of (M/2) and
a number of blocking intervals per period of the AC voltage q out of the integers between and including 0 and C−1, such that the set value of the power is as close as possible below the maximum power transmittable by a single phase of the AC voltage times 2 sin(k π/M)(1−q/C).

M is the number of phases of the multiphase AC voltage and C is the bump-number.

The power transmittable by a single phase is the power transmittable if the phase would be connected to a neutral conductor as it is the case in a star connection instead of a second phase as it is the case in a polygon connection.

The integer quotient is the greatest whole number of times a divisor may be subtracted from a dividend without the remainder becoming negative.

If the conductors connected to the phases of the multiphase AC voltage are connected in a polygon-connection and if there are more than three phases, the transmitted power can be varied by varying the voltage in addition to varying the current. The amplitude of the combined voltage function equals 2 sin $$\left(\frac{a}{2}\right)$$

with "a" being the phase difference between the connected conductors. If there are M phases, the smallest phase difference is 360°/M and the largest phase difference is 180° if M is even and 180° (1−1/M) if M is uneven. Possible phase differences are k*360°/M with k being an integer which is varying between 1 and the integer quotient of (M/2). Therefore, one can obtain the following voltage amplitudes by choosing the suitable phases: 2 sin $$\left(k\frac{\pi}{M}\right)$$

with k=1 . . . integer quotient of $$\left(\frac{M}{2}\right).$$

The idea of this embodiment is to come as close as possible to the desired set value of the output power by adapting the time during which power is transmitted and by adapting the voltage and only then to vary the current. The time during which power is transmitted is regulated by choosing the number of blocking intervals during one period of the AC voltage. The voltage is adapted by connecting phases with the desired phase difference.

As an example in the case of 4 phases, k can be 1 or 2. The bump-number C equals 4 and q can have values between 0 and 4. Therefore the following fractions of the maximum power transmittable by a single phase can be reached by varying k and q:

| k | q | Fraction of maximum power transmittable by a single phase |
|---|---|---|
| 2 | 0 | 2 |
| 2 | 1 | 1.5 |
| 1 | 0 | 1.414 |
| 1 | 1 | 1.061 |
| 2 | 2 | 1 |
| 1 | 2 | 0.707 |
| 2 | 3 | 0.5 |
| 1 | 3 | 0.354 |
| 1 or 2 | 4 | 0 |

In one embodiment, the conductors of the multiphase AC side are connected such that their connection can be varied between a star connection and a polygon connection.

In this case, k is chosen out of the following set: (M/6) and the set of integers between and including one and the integer quotient of (M/2). The number of blocking intervals per period of the multiphase AC voltage q is chosen out of the integers between and including zero and C−1. The choice is such that the set value of the output power is as close as possible below a maximum power transmittable by a single phase of the multiphase AC voltage times 2 sin $$\left(k\frac{\pi}{M}\right)\left(1-\frac{q}{C}\right).$$

If k=M/6 is chosen, the conductors are connected in a star connection: 2 sin $$\left(\frac{M}{6}\frac{\pi}{M}\right)=1.$$

As the maximum power transmittable by a single phase is nothing else than the power transmitted by a single phase in the star connection in the absence of all blocking intervals (q=0) and as the maximum power transmittable by a single phase is the unit with which 2 sin $$\left(k\frac{\pi}{M}\right)\left(1-\frac{q}{C}\right)$$

shall be multiplied, it is a requirement that in this special case 2 sin $$\left(k\frac{\pi}{M}\right)\left(1-\frac{q}{C}\right)$$

equals 1. With q=0 and k=M/6 the condition is fulfilled. If k is chosen differently, the conductors are connected in a polygon connection with the phase angle difference between connected conductors being equal to k $$\frac{\pi}{M}.$$

As an example in the case of 3 phases (M=3), k can be 1 or 0.5=M/6. The number of bumps C equals 6 and q can have values between 0 and 6. Therefore the following fractions of the maximum power transmittable by a single phase can be reached by varying k and q:

| k | q | Fraction of maximum power transmittable by a single phase |
|---|---|---|
| 1 | 0 | 1.732 |
| 1 | 1 | 1.44 |
| 1 | 2 | 1.15 |
| 0.5 | 0 | 1 |
| 1 | 3 | 0.87 |
| 0.5 | 1 | 5/6 = 0.83 |
| 0.5 | 2 | 4/6 = 0.67 |
| 1 | 4 | 0.58 |
| 0.5 | 3 | 3/6 = 0.5 |
| 0.5 | 4 | 2/6 = 0.33 |
| 1 | 5 | 0.29 |
| 0.5 | 5 | 1/6 = 0.17 |

In another embodiment, the number of blocking intervals per period of the AC voltage q and the phase difference multiple k are chosen such that the efficiency of the converter at hand is highest for a given of set value the output power. The most efficient combination of q and k can be evaluated by measuring the efficiency of every combination at a number of possible set values of the output power, e.g. in steps of 5% between zero and the nominal maximum output power, and then by interpolating between these data points. This efficiency evaluation can be done once for every converter type of interest and then the information about the most efficient combination can be saved on an internal memory for all converters of the same type.

In a preferred embodiment, the number N of conductors equals three and all conductors are connected to phases of the AC multiphase voltage and wherein the method comprises preferably the step of rectifying the currents between all combinations of the current-carrying conductor.

This embodiment is particularly simple, robust and cost efficient.

In one embodiment a DC voltage enters the switched mode power converter at an input and the multiphase AC voltage leaves the switched mode power converter at the multiphase AC side. The duration of the period of the multiphase AC voltage, and preferably also further properties of the multiphase AC voltage across the output of the converter, are determined by a grid to which the converter is connected.

Such a converter is especially easy to install and does not require any knowledge of the user.

In one embodiment, the duration of the period of the multiphase AC voltage, and preferably also further properties of the multiphase AC voltage leaving the converter, are determined by a user input.

Such a converter can be adapted to the grid it should be used with and it does not need sensors for determining the output grid properties.

In one embodiment, the duration of the period of the multiphase AC voltage, and preferably also further properties of the multiphase AC voltage leaving the converter, are determined by the converter itself.

Such a converter requires only a small number of parts.

Properties of the multiphase AC voltage are preferably one or more of the following: the period, the phase angle, the amplitude and/or the waveform for each of the occurring phases.

In one embodiment, the multiphase AC voltage enters the switched mode power converter at the multiphase AC side. All of the conductors are connected to the phases of the multiphase AC voltage. In this embodiment, the method comprises preferably the step of rectifying the currents between all combinations of current-carrying conductors with a rectifier, preferably with a bridge rectifier comprising diodes.

The conductors can be connected in such a way that a phase angle difference between the connected conductors is the largest possible given the number of phases of the connected AC voltage.

The conductors can also be connected in such a way that every conductor is connected with every other conductor.

Further the conductors can be connected in such a way that the phases connected to them have a fixed phase difference.

The rectifier can also be a Vienna-rectifier or a bridge rectifier comprising thyristors or other unidirectional switches. Other known types of rectifiers can be used, too.

In one embodiment, the method comprises the following steps:

A pattern is used repeatedly to determine the blocking intervals if the set value of the output power is below the first power threshold.

The pattern is a combination of one or more subpatterns.

The subpattern is a sequence of Q and P elements, wherein a Q element indicates a blocking interval and a P element indicates the absence of a blocking interval, and wherein there are C/2 or C elements in a subpattern and wherein an order of the elements in the subpattern indicates the distances between the blocking intervals. C is the bump-number.

The duration of one applied pattern is the length of the occurring subharmonics. The duration of one applied subpattern is one half of the length of one period of the multiphase AC voltage or it equals the length of one period of the multiphase AC voltage.

Combining more than one subpattern in a pattern allows to distribute the load more evenly on the different phases.

The number of elements in a subpattern can be C/2, as the current-carrying conductors are the same in the first 180° and the second 180° of the AC voltage period, as only the direction of the current turns between the first and the second half of the AC voltage period.

In another embodiment, the number of elements in a subpattern is C and equals the bump-number.

In one embodiment, the pattern consists only of P elements, as long as the set value of the output power is above or equals the first power threshold.

According to one embodiment, the pattern consists of one subpattern.

In this embodiment, there are no subharmonics. There is no dc-part in the resulting current. Further, the load can be concentrated on a desired subset of phases of the multiphase AC voltage.

According to one embodiment, the pattern consists of an integer multiple of $E!/(X!*(E-X)!)$ different subpatterns which have all the same number of Q and P elements, whereby X is the number of Q-elements per subpattern and whereby all of the different subpatterns occur equally often in the pattern and whereby E is the number of elements in a subpattern.

E is the number of elements in a subpattern and E can have the value of C, the bump-number, or of C/2.

The number of Q-elements is preferably chosen depending on the set value of the output power.

The number of different permutations of a set with length E and comprising X elements of a first type and (E−X) elements of a second type is $$\frac{E!}{X!(E-X)!}.$$

Therefore, asking for $$\frac{E!}{X!(E-X)!}$$

different subpatterns is equivalent to asking for all possible subpatterns with X Q-elements and (E−X) P-elements.

For example with three phases and a bump-number of 6, one blocking interval per half-period of the AC voltage and three elements in a subpattern, all possible subpatterns are [QPP], [PQP], [PPQ].

Examples of pattern according to this embodiment are therefore the following:

[[QPP], [PQP], [PPQ]], where all possible subpatterns occur once, and

[[QPP], [PQP], [PPQ], [PPQ], [PQP], [QPP]], where all possible subpattern occur twice.

As all phases are blocked for the same duration in the time span needed for one pattern, the load is equally balanced between all phases over the timescale of one pattern. As one subpattern can be applied during one half-period of the AC voltage, the time span during which one pattern is applied is the number of subpattern in the pattern times the half-period of the AV voltage or, in other words, the integer multiple of $$\frac{1}{2}\frac{E!}{X!(E-X)!}$$

periods of the AC voltage. The current and the power are distributed equally over all phases. There is no dc-part in the resulting current.

In one embodiment, the subpatterns are arranged in such a way in the pattern, that there are the same number Q-elements behind each other everywhere.

This has the advantage that the effective duration during which the power transmission is blocked is always the same. This lowers the requirements on possible output filters.

One example for such a pattern with only one Q element is the following:

[[QPP], [PQP], [PPQ], [PPQ], [PQP], [QPP]].

Even if this pattern is repeated over and over again, there is always at least one P element between two subsequent Q elements.

Another example, comprising two Q elements is the following:

[[PQQ],[QPQ],[QQP]].

If this pattern is repeated over and over again, there are always three Q elements behind each other. These groups of three Q elements are separated by either one or two P elements.

This embodiment is only possible in the cases where a subpattern comprises only one P or only one Q element. Preferably, the subpatterns are arranged such that the variation in the number of subsequent Q elements is as small as possible.

In one embodiment a first switching signal is determined from a voltage value of at least one conductor connected to one phase of the multiphase AC voltage and the set value of the output power.

The voltage of at least one conductor connected to a phase is used to determine the phase angle and/or the period of the AC voltage. The set values of the output power is used to determine the number of blocking intervals per voltage period.

The first switching signal is a signal which controls at least one switch of the switching mode power converter.

In an example of a boost converter, the first switching signal is a PWM signal with a duty cycle determining the output voltage of the boost converter.

In one embodiment, a pattern-signal is multiplied to the first switching signal. This results in a pattern-determined switching signal. In this embodiment, the first switching signal is a PWM signal and the pattern-signal represents the pattern by a series of 0 and 1, wherein every Q-element is replaced by 0 for the duration of one block length and every P-element is replaced by 1 for the duration of one block length. In this embodiment, a pattern-determined switching signal of zero keeps the switch in a position that prevents a power flow through the converter.

PWM stands for pulse width modulation. The first switching signal may be used to control the switch of a boost converter or for a switch with another function and placement in the switched mode power supply. The frequency and duty cycle of the first switching signal may depend on the desired output voltage and/or on the parameters of the components of the switched mode power supply and is in general independent of the AC voltage frequency. The pattern is represented by a pattern-signal. The pattern signal can be a PWM signal, too. The pattern-signal is synchronized in the desired way with the AC voltage. If the pattern-signal is a PWM signal, it has an amplitude representing zero for the duration of one block length for every Q-element in the pattern and it has an amplitude representing one for the duration of one block length for every P-element. If the first switching signal and the pattern signal are both PWM signals, multiplying the first switching signal with the pattern-signal signal results in a pattern-determined switching signal which resembles the first switching signal outside of the blocking intervals and which is zero during the blocking intervals.

This method makes is very easy to implement the inventive idea in an existing converter design: The unchanged switching signal can be produced without any changes. The multiplication of the signals can happen shortly before the signal is transmitted to the switch. The switch can be the same as in the existing converter design.

It is also possible that the pattern is represented in a different way in the pattern-signal: Q and P elements could be represented by different frequencies or by short peaks representing the beginning of a P or a Q element. In such embodiments, the first switching signal and the pattern-signal should be combined such that the signature of the P or Q elements can still be seen in the pattern-determined switching signal. Such a combination can be an addition or a multiplication.

However, it is also possible that the pattern-signal is not combined with the first switching signal: The switched mode power supply may comprise a switch which is only used for the method at hand and which receives therefore directly the pattern-signal in a suitable way. It is further possible that the pattern-signal stops the transmission of parts of the first switching signal or that a switch is used which can handle two signal inputs.

According to the invention, there is a controller for carrying out the method presented above.

Such a controller can be added to an otherwise unchanged converter design. The converter design should be adapted such that the original switching signal can be altered by the controller before being transmitted to the switch.

Such a controller can also be added together with an additional switch in a conventional switched mode power converter. The switch can be placed such that it can hinder the power transmission through the converter and the controller can be used to control this switch in order to execute the method described above.

It is possible that the controller controls more than one switch to either hinder the power transmission through the converter and/or to determine the current-carrying conductors.

In one embodiment, the controller comprises an input port for receiving information about the set value of the output power.

This allows the controller to determine the suitable amount of blocking intervals during one AC voltage period.

A switched mode power converter according to the invention, which uses the method described above, comprises an AC multiphase terminal, preferably an input terminal, with terminals for at least two phases and a neutral or at least three phases. It comprises further at least one controllable switch and a controller as described above. The controller controls the at least one controllable switch such that the method described above is executed.

According to one embodiment, the converter comprises an AC/DC converter, with preferably a full bridge rectifier or a Vienna rectifier. It comprises also voltage or current detection means to detect the voltage or the current in at least one conductor connected to one phase of the multiphase AC voltage and a DC/DC converter, preferably a boost or a buck converter, comprising the at least one controllable switch.

In this embodiment, the power transfer through the complete converter can be blocked by controlling the switch of the DC/DC converter.

In other embodiments, switches in the rectifier are used to block the power transfer. In further embodiments, a switch is placed between the AC/DC and the DC/DC converter to block the power transfer. In another embodiment, a switch is placed before an output capacitor and can block the power transfer at this place.

In one embodiment, the converter comprises in addition controllable phase line switches which can be controlled by the controller and which can interrupt the power flow in the conductors connected to the associated phase.

This allows to determine the phase angle difference between the connected conductors.

An inverter, preferably a solar inverter, using a method as described above comprises a DC input and the multiphase AC side as an output. The multiphase AC side comprises terminals for at least two phases and a neutral or at least three phases. This inverter further comprises a DC/AC converter. The DC/AC converter has preferably a full bridge configuration and comprises at least one controllable switch per conductor connected to a phase. The inverter further comprises the controller which controls the controllable switches of the DC/AC converter in order to execute the method described above.

In the case of an inverter, the set value of the output power can be a set value of the power input on the DC input or a set value of a power output on the AC side. For example, the set value of the output power can be given by the power produced by a DC source like a solar module and feed into the converter. The set value of the output power can also be a power requested by a load which needs AC power like a motor.

Other advantageous embodiments and combinations of features come out from the detailed description below and the entirety of the claims.

BRIEF DESCRIPTION OF THE DRAWINGS

The drawings used to explain the embodiments show.

PREFERRED EMBODIMENTS

Figure 1A:
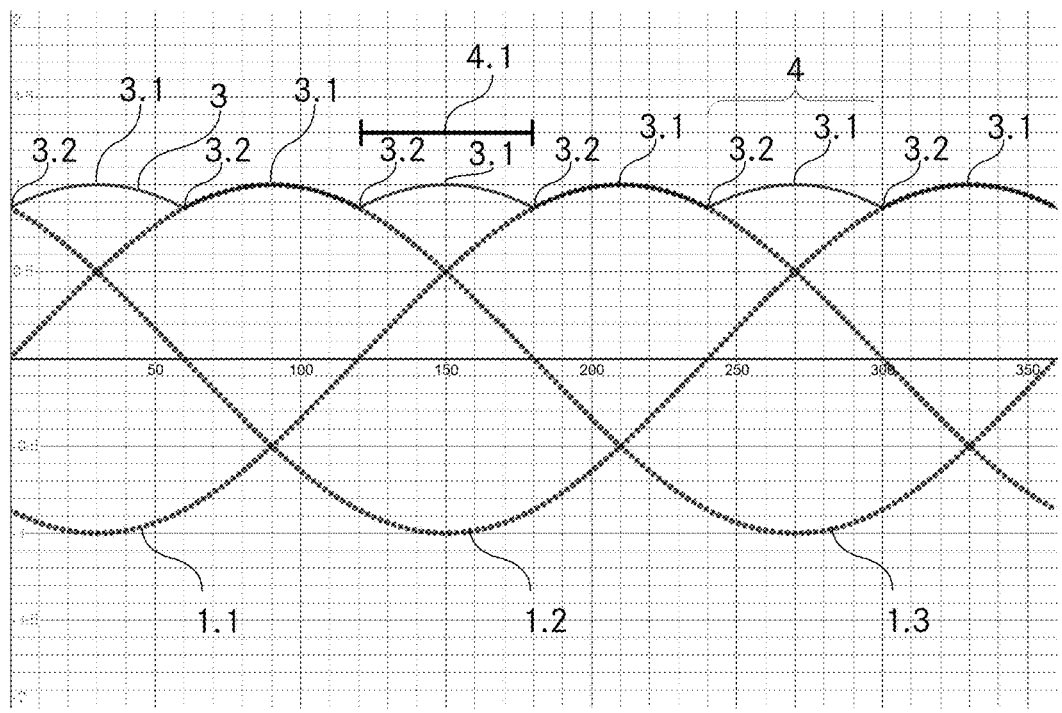
FIG. 1a Multiphase AC-Voltages in a star connection as well as the combined voltage function $V_{tot}(t)$
FIG. 1b Multiphase AC-Voltages in a polygon connection as well as the combined voltage function $V_{tot}(t)$.

FIG. 1a shows the voltage waveform of three phases 1.1, 1.2 and 1.3 which are shifted by 120° with respect to each other in dotted lines. The three voltage waveforms all have the shape of a sinus with an amplitude of one. The x-axis of the graph shows the phase angle and runs from 0° to 360°.

If the three phases are connected in a star connection, the voltages at the output are the difference between the phases and the neutral and therefore the resulting waveforms look the same as the voltages of the three phases 1.1, 1.2 and 1.3.

The combined voltage function $V_{tot}(t)$ 3 is shown as a solid line: It equals the highest absolute value of the three phase waveforms 1.1, 1.2 and 1.3. Its maximum value equals one and its minimum value equals sin(60°)=0.866. It has six maxima 3.1 in the phase angle interval of 0° to 360°. A bump length 4.1 is the distance between two subsequent minima 3.2 of the combined voltage function $V_{tot}(t)$ 3 and is 60° long in this example. A bump 4 is the waveform of the combined voltage function $V_{tot}(t)$ 3 between two subsequent minima.

In the example in FIG. 1a, the waveform of phase 1.1 is negative during the first bump 4 but its absolute value is the largest of all phases. The second bump 4 follows the waveform of the phase 1.3 which is positive in this region. The third bump 4 is the negative of the phase 1.2. The fourth bump 4 follows the waveform of the phase 1.1. The fifth bump 4 is the negative of the phase 1.3 and the sixth bump 4 follows the waveform of the phase 1.2. Therefore, if there is a resistive load connected between the phases and the neutral, a current flows into phase 1.1 during 0° to 60°, followed by a current flowing out of phase 1.3 during 60° and 120°, followed by a current flowing into phase 1.2 during 120° and 180°, followed by a current flowing out of phase 1.1 during 180° and 240°, followed by a current flowing into phase 1.3 during 240° and 300° and finally followed by a current flowing out of phase 1.2 during 300° and 360°. Obviously all phases deliver power for 120° phase angle in total during one AC voltage period of 360°.

Figure 1B:
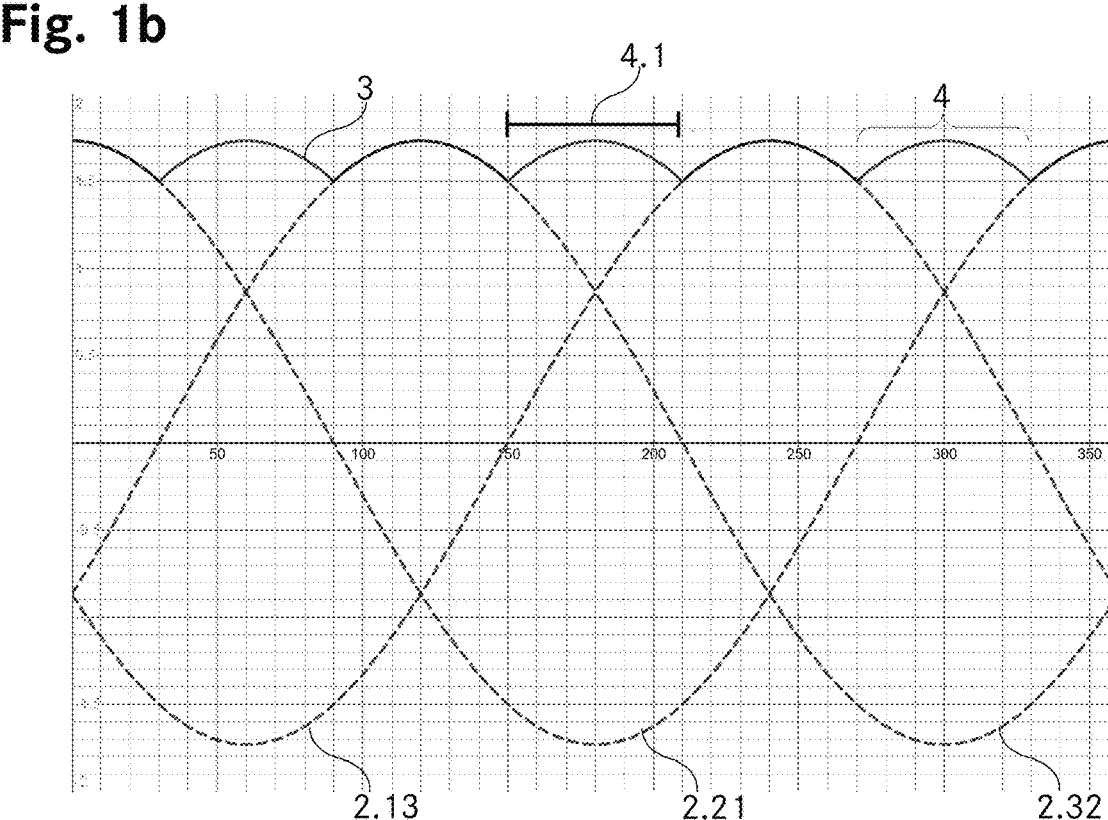

In the example in FIG. 1b, the phases 1.1, 1.2 and 1.3 are connected in a delta connection. Therefore, the resulting voltage at the output is always the difference between two of the phases 1.1, 1.2 and 1.3. The difference voltage 2.13 is the voltage between the phases 1.1 and 1.3. The difference voltage 2.21 is the voltage between the phases 1.2 and 1.1. The difference voltage 2.32 is the voltage between the phases 1.3 and 1.2. The difference voltages 2.13, 2.21 and 2.32 are shown as dashed lines. The phase angle between them is 120° and they have the shape of a sine with an amplitude of 2 sin(60°)=1.732.

The combined voltage function $V_{tot}(t)$ 3 is shown as a solid line: It equals the highest absolute value of the difference voltage waveforms 2.13, 2.21 and 2.32. Its maximum value equals 2 sin(60°)=1.732 and its minimum value equals 1.5. It has six maxima 3.1 in the phase angle interval of 0° to 360°. A bump length 4.1 is the distance between two subsequent minima 3.2 of the combined voltage function $V_{tot}(t)$ 3 and is 60° long in this example. A bump 4 is the waveform of the combined voltage function $V_{tot}(t)$ 3 between two subsequent minima.

In the example in FIG. 1b, the difference voltage 2.21 is positive during the first bump 4 from −30° to 30° phase angle. Due to the choice of the coordinate system, only half of this bump 4 is shown. The second bump 4 is the negative of the difference voltage 2.13 in the phase angle interval between 30° and 90°. The third bump 4 follows the difference voltage 2.32 in the phase angle interval between 90° and 150°. The fourth bump 4 in the negative of the difference voltage 2.21 in the phase angle interval between 150° and 210°. The fifth bump 4 follows the difference value 2.13 and the sixth bump 4 is the negative of the difference voltage 2.32 in the phase angle intervals between 270° and 330°. The sixth bump is followed by the first half of the first bump 4 considering the fact that the phase angles between −30° and 0° are the same as the phase angles between 330° and 360°.

Therefore, if there is a resistive load connected between the phases, a current flows from phase 1.2 into phase 1.1 during 0° to 30°, followed by a current flowing from phase 1.3 into phase 1.1 during 30° and 90°, followed by a current flowing from phase 1.3 to phase 1.2 during 90° and 150°, followed by a current flowing from phase 1.1 into phase 1.2 during 150° and 210°, followed by a current flowing into from phase 1.1 into phase 1.3 during 210° and 270°, followed by a current from phase 1.2 to phase 1.3 during 270° and 330°, finally followed by a current from phase 1.2 into 1.1 starting at a phase angle of 330°. Obviously all phases are involved in the delivery of power for 240° phase angle in total during one AC voltage period of 360°.

Figure 2A:
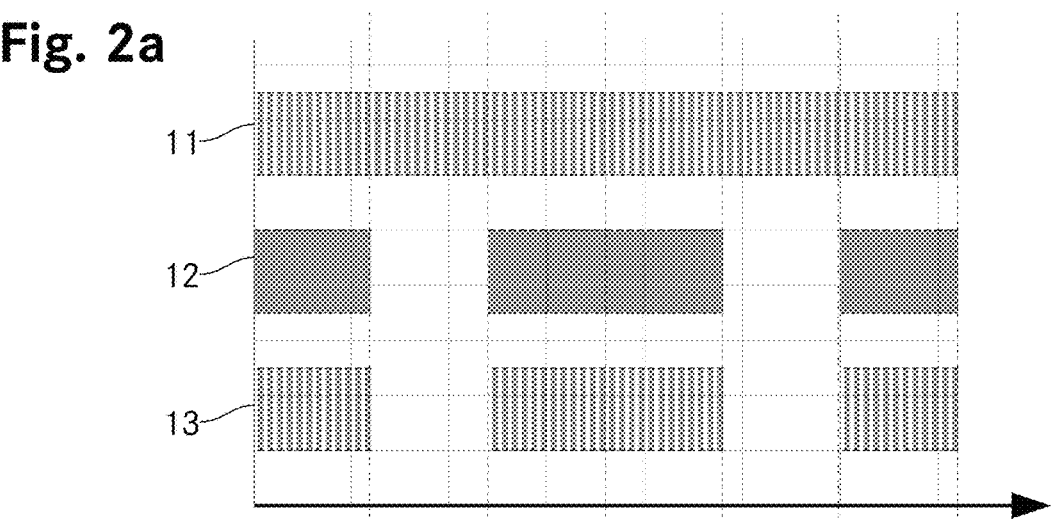
FIG. 2a The first switching signal of a boost converter, the pattern-signal and the pattern-determined switching signal.
Figure 2B:
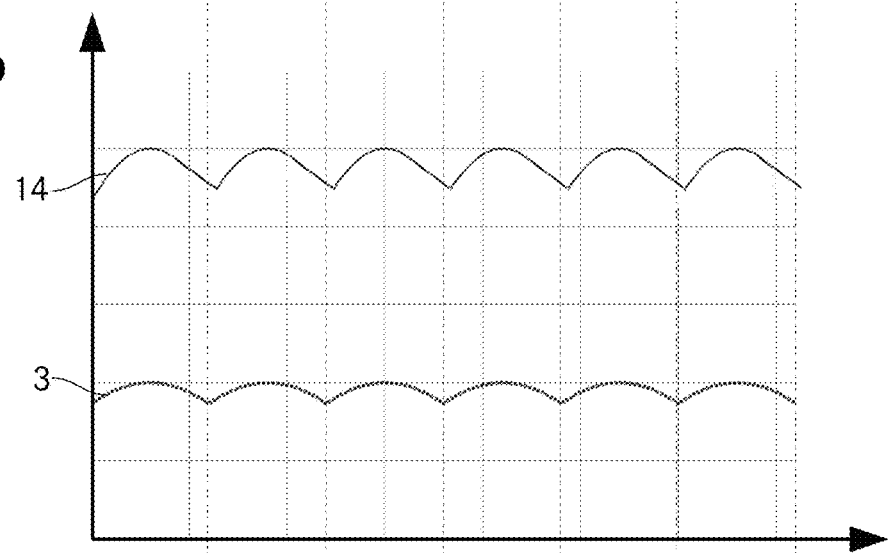
FIG. 2b The combined voltage function and the voltage at the output capacitor of a switched mode power supply with a boost converter in the case of a set value of the output power being above a first power threshold.
Figure 2C:
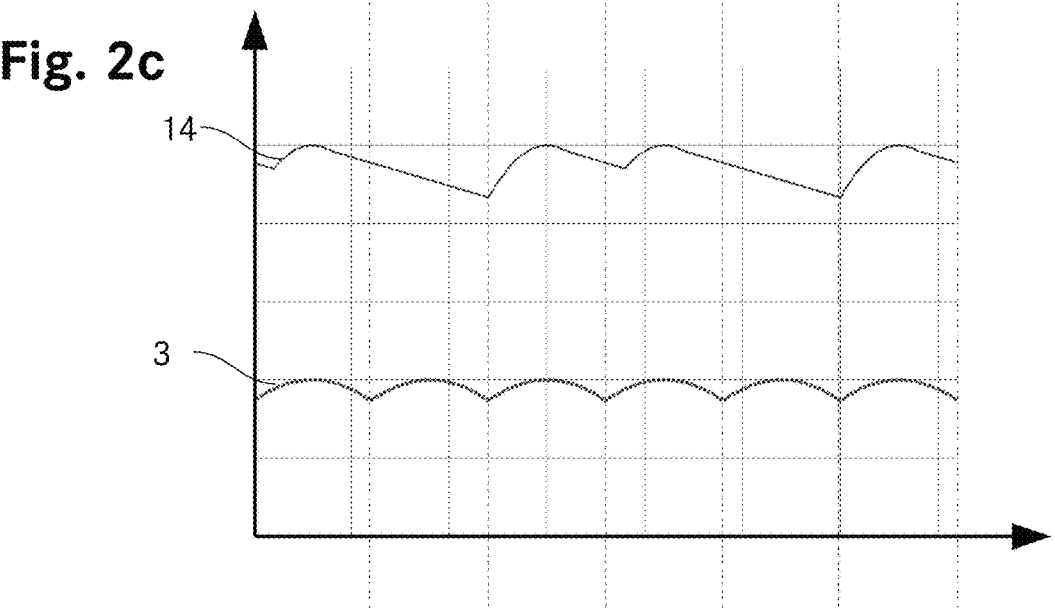
FIG. 2c The combined voltage function and the voltage at the output capacitor of a switched mode power supply with a boost converter in the case of a set value of the output power being below a first power threshold.

FIG. 2a shows an example on how a pattern-determined switching signal 13 is constructed and its effect on the resulting waveform in the case of a converter arrangement with three phases (1.1, 1.2, 1.3) connected in a star connection or in a delta connection to a diode bridge rectifier followed by a boost converter comprising a controllable switch and an output capacitor 8. A load 5 is connected to the output capacitor 8. FIG. 2b shows the voltages on the input of the boost converter, which is in the case at hand the combined voltage function 3, and the voltage over the output capacitor 14 with the load 5 requesting a maximum power output which is above the first power threshold. FIG. 2c shows the same voltages in the case of the load 5 requesting a power output which is below the first power threshold.

The x-axis of the FIGS. 2a, b and c always shows the phase angle. The phase angles at which one bump 4 ends and the next bump 4 begins are marked by dashed, vertical lines passing through all FIGS. 2a, b and c for the ease of comparison.

The y-axis of FIG. 2a is arbitrary: The depicted signals 11, 12, 13 are binary, i.e. zero and one, and a grey area indicates the value of one at the indicated phase angle, while a white area indicates a value of zero at the indicated phase angle.

The y-axis of FIGS. 2b and 2c shows the voltage.

FIG. 2a shows three signals: on the top, there is the first switching signal 11 which is the PWM signal for the switch of the boost converter. In the example at hand, its duty cycle is ⅖. Its frequency is significantly higher than the frequency of the bumps 4 in the combined voltage function $V_{tot}(t)$. In the middle, there is the pattern-signal 12. It is a PWM signal in this case. The pattern which is represented by the depicted pattern-signal 12 is [101101] or [PQPPQP]. This pattern-signal 12 is synchronized to the combined voltage function $V_{tot}(t)$ 3 and its duty cycle is chosen depending on the set value of the output power. Here, the duty cycle is ⅔. The frequency is twice the multiphase AC voltage frequency or ⅓ of the bump 4 frequency as the subpattern [101] repeats every 3 bumps or every 180° of the multiphase AC voltage. The signal at the bottom of FIG. 2a is the pattern-determined switching signal 13. The pattern-determined switching signal 13 is the product of the first switching signal 11 and the pattern-signal 12.

The dotted line in FIGS. 2b and 2c shows the undisturbed combined voltage function $V_{tot}(t)$ 3. This is the output voltage of the bridge rectifier and the input voltage of the boost converter. The combined voltage functions $V_{tot}(t)$ 3 is a series of bumps 4 with equal bump length 4.1. The minimum and the maximum value of the bumps 4 stay constant with increasing phase angle.

In order to illustrate the method, the boost converter is assumed to be used with a first switching signal with a constant duty cycle. The method would work the same way with a first switching signal with a changing duty cycle in order to minimize the voltage ripple on the output.

Further, the load 5 is, again mainly for illustration purposes, assumed to consist of a parallel circuit of a resistor and a capacitance. In FIG. 2b, the capacitance is assumed to be small. In FIG. 2c, the capacitance is assumed to be large. The output capacitor 8 of the boost converter is assumed to be small and chosen to dampen the high frequency ripple of the first switching signal 11.

In FIG. 2b, the load can handle the maximum output power. The first power threshold is below the maximum output power. Consequently, there are no blocking intervals and the pattern-determined switching signal 13 equals the first switching signal 11 as shown in the top row of FIG. 2a. As the duty cycle is ⅖ and as the frequency of the first switching signal 11 is high compared to the bump 4 frequency, the voltage on the output capacitor 14 is essentially proportional to 2.5 times the voltage on the input of the boost converter or the combined voltage function 3. We further assumed here, that the load 5 consumes the requested power essentially immediately, as the internal capacitance should be small, such that there are nearly no noticeable damping effects on the time scale of a bump length 4.1. Assuming a larger internal capacitance, the ripple in the waveform of the voltage over the output capacitor would be reduced.

In FIG. 2c, the load 5 requests less power and has a large internal capacitance: The set value of the output power is lower than the first power threshold. Therefore, a pattern with a duty cycle of ⅔ is converted in a pattern-determined switching signal 13 which is multiplied to the first switching signal 11 of the boost converter. If this pattern-determined switching signal 13 is used as control signal for the switch in a boost converter, the switch stays open during the bumps 4 where the pattern-controlled switching signal 13 equals zero. This resembles a duty cycle of zero for the switch of the boost converter. The output voltage equals the input voltage of the boost converter under these conditions. This output voltage is significantly lower than the output voltage of the boost converter during times with a higher duty cycle. Due to the diode of the boost converter, the internal capacitance of the load 5 can only discharge via the resistor. The load 5 request only little power if a pattern indicating blocking intervals is active at all. Therefore, the capacitance discharges only slowly and keeps a voltage 14, which is higher than the input voltage. In FIG. 2c this slow discharging of the capacitance is depicted by the slowly dropping voltage 14 over the capacitance. As the voltage on the input of the boost converter is, during the blocking intervals, smaller than the voltage 14 over the internal capacitance, there is no current flowing from the input through the output and into the load 5 during the blocking interval. As there is no current flowing from the input to the output of the converter as a whole, there is no power flow through the converter.

Figure 3A:
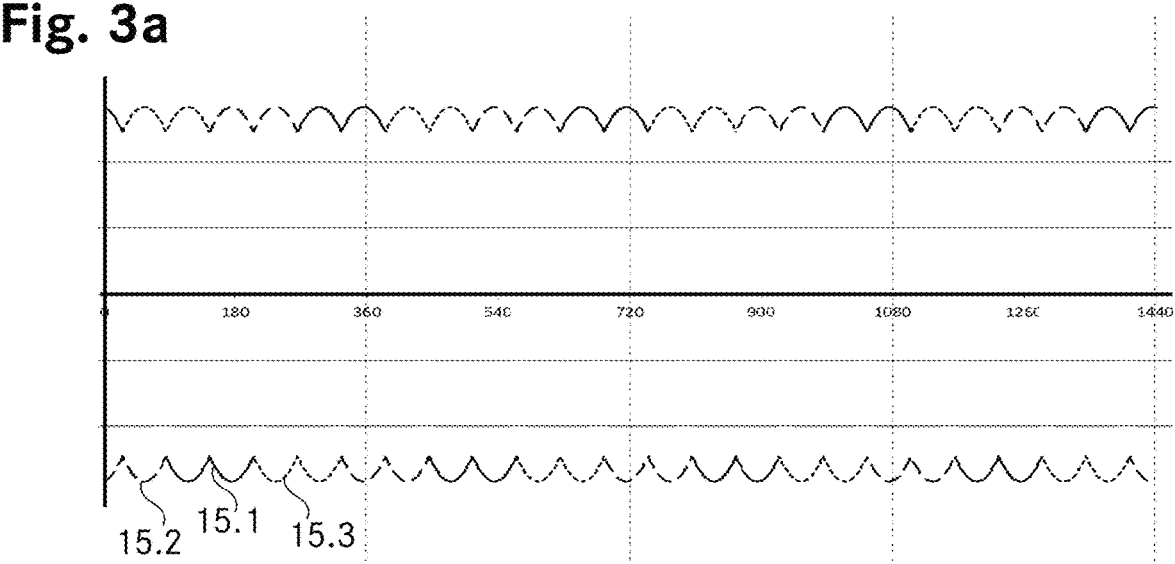
FIG. 3a Phase currents without blocking intervals.
Figure 3B:
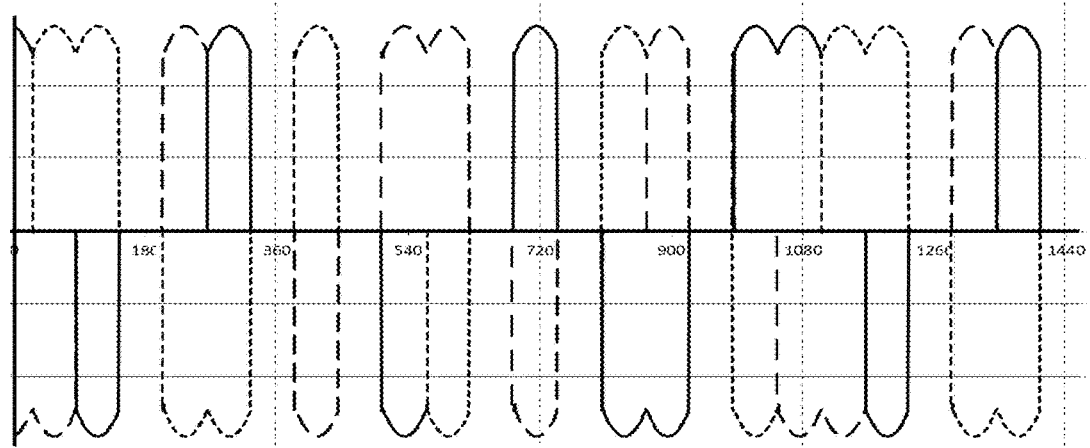
FIG. 3b Phase currents with one blocking interval.
Figure 3C:
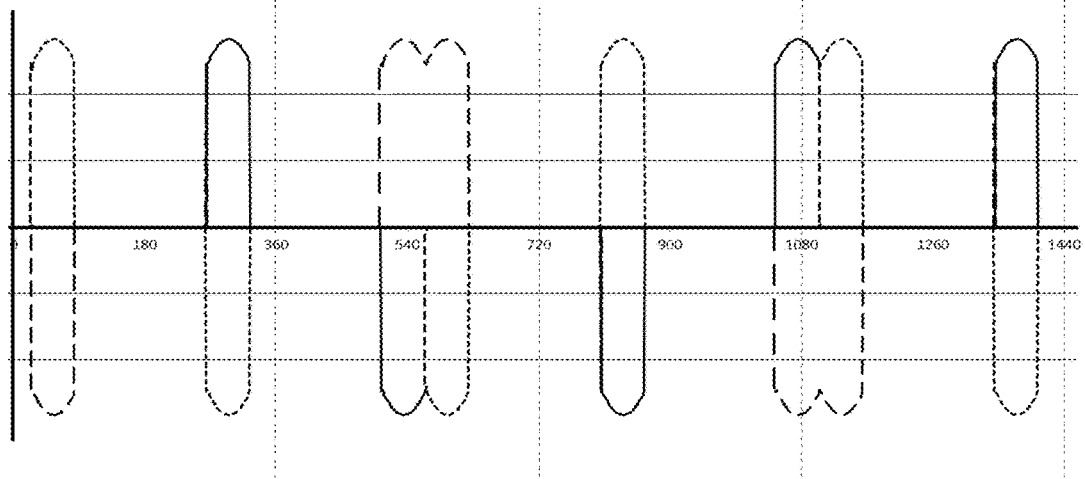
FIG. 3c Phase currents with two blocking intervals.

FIGS. 3a, 3b and 3c show the currents in a converter with three phases connected in a polygon connection: The current in the first phase conductor 15.1 is shown with a solid line, the current in the second phase conductor 15.2 is shown with a dashed line and the current in the third phase conductor 15.3 is shown with a dotted line. The x-axis of these figures shows the phase angle in degree while the y-axis shows the current in an arbitrary unit. For the ease of comparison, vertical, dashed lines are shown which cross all x-axis at integer multiples of 360° phase angle.

FIG. 3a shows the situation without any blocking intervals. The pattern has a duty cycle of 1. FIG. 3b shows the situation with one blocking interval every 180°-phase angle. The pattern has a duty cycle of ⅔. Finally, FIG. 3c shows the situation with two blocking intervals every 180° phase angle. The applied pattern has a duty cycle of ⅓.

From FIG. 3a one can clearly determine that there are six bumps 4 per period of the multiphase AC voltage, i.e. per 360° phase angle interval. A block length 4.1 is therefore 60° if expressed in phase angles.

As the phase conductors 1.1, 1.2, 1.3 are connected in a polygon connection, there is a current in two phase conductors 1.1, 1.2, 1.3 if there is any current at all. In the following, we will assume that a positive current flows from the source to the sink and that therefore the conductor with the positive current value is the source and the conductor with the negative current value is the sink. Depending on the conventions, the opposite is of course also possible.

FIG. 3a shows the following:

| Phase angle interval | Source | Sink | Involved phases | Combination of current-carrying conductors |
|---|---|---|---|---|
| 0°-30° | $1^{st}$ | $2^{nd}$ | $1^{st}$ and $2^{nd}$ | 12 |
| 30°-90° | $3^{rd}$ | $2^{nd}$ | $2^{nd}$ and $3^{rd}$ | 32 |
| 90°-150° | $3^{rd}$ | $1^{st}$ | $1^{st}$ and $3^{rd}$ | 31 |
| 150°-210° | $2^{nd}$ | $1^{st}$ | $1^{st}$ and $2^{nd}$ | 21 |
| 210°-270° | $2^{nd}$ | $3^{rd}$ | $2^{nd}$ and $3^{rd}$ | 23 |
| 270°-330° | $1^{st}$ | $3^{rd}$ | $1^{st}$ and $3^{rd}$ | 13 |
| 330°-360° | $1^{st}$ | $2^{nd}$ | $1^{st}$ and $2^{nd}$ | 12 |

Therefore, every phase conductor is the source for a duration of in total 120° phase angle and it is also the sink for a duration of in total 120° phase angle. The load is equally balanced between the phases.

One can also see that if the direction of the current is of interest, the situation repeats itself every 360° and if the direction is not of any interest, the situation repeats itself every 180°.

FIG. 3b depicts the currents in the case of the pattern [PPQ,PPQ,PQP,PQP,QPP,QPP] or [110,110,101,101,011,011]. Here, the pattern is written with the subpatterns divided by commas. In the case of three phases and if the direction of the current is not of any interest, a subpattern consists of three elements. The possible subpatterns for a duty cycle of ⅔ are [PPQ], [PQP] and [QPP] or [110], [101] and [011]. In the pattern used in FIG. 3b, every subpattern occurs twice. Therefore the pattern has a period of 2*3*180°=1080°. The frequency of the pattern is ⅓ of the multiphase AC voltage frequency.

FIG. 3b shows the following current flows:

| Phase angle interval | Source | Sink | Involved phases | Combination of current-carrying conductors |
|---|---|---|---|---|
| 0°-30° | $1^{st}$ | $2^{nd}$ | $1^{st}$ and $2^{nd}$ | 12 |
| 30°-90° | $3^{rd}$ | $2^{nd}$ | $2^{nd}$ and $3^{rd}$ | 32 |
| 90°-150° | $3^{rd}$ | $1^{st}$ | $1^{st}$ and $3^{rd}$ | 31 |
| 150°-210° | — | — | — | — |
| 210°-270° | $2^{nd}$ | $3^{rd}$ | $2^{nd}$ and $3^{rd}$ | 23 |
| 270°-330° | $1^{st}$ | $3^{rd}$ | $1^{st}$ and $3^{rd}$ | 13 |
| 330°-390° | — | — | — | — |
| 390°-450° | $3^{rd}$ | $2^{nd}$ | $2^{nd}$ and $3^{rd}$ | 32 |
| 450°-510° | — | — | — | — |
| 510°-570° | $2^{nd}$ | $1^{st}$ | $1^{st}$ and $2^{nd}$ | 21 |
| 570°-630° | $2^{nd}$ | $3^{rd}$ | $2^{nd}$ and $3^{rd}$ | 23 |
| 630°-690° | — | — | — | — |
| 690°-750° | $1^{st}$ | $2^{nd}$ | $1^{st}$ and $2^{nd}$ | 12 |
| 750°-810° | — | — | — | — |
| 810°-870° | $3^{rd}$ | $1^{st}$ | $1^{st}$ and $3^{rd}$ | 31 |
| 870°-930° | $2^{nd}$ | $1^{st}$ | $1^{st}$ and $2^{nd}$ | 21 |
| 930°-990° | — | — | — | — |
| 990°-1050° | $1^{st}$ | $3^{rd}$ | $1^{st}$ and $3^{rd}$ | 13 |
| 1050°-1080° | $1^{st}$ | $2^{nd}$ | $1^{st}$ and $2^{nd}$ | 12 |

Every phase is for 4*60°=240° phase angle the source and for the same phase angle length the sink of the current. Therefore, the load is equally distributed between all phases.

Due to the distribution of blocking intervals, the period of this situation is always 1080°, no matter if the direction of the current plays a role or not.

FIG. 3c depicts the currents in the case of the pattern [100,010,001]. Here, the pattern is written with the subpatterns divided by commas. In the case of three phases and if the direction of the current is not of any interest, a subpattern consists of three elements. The possible subpatterns for ea duty cycle of ⅓ are [100], [010] and [001]. In the pattern used in FIG. 3b, every subpattern occurs once. Therefore the pattern has a period of 1*3*180°=540°. The frequency of the pattern is ⅔ of the multiphase AC voltage frequency.

FIG. 3c shows the following current flows:

| Phase angle interval | Source | Sink | Involved phases | Combination of current-carrying conductors |
|---|---|---|---|---|
| 0°-30° | — | — | — | |
| 30°-90° | $3^{rd}$ | $2^{nd}$ | $2^{nd}$ and $3^{rd}$ | 32 |
| 90°-150° | | | | |
| 150°-210° | | | | |
| 210°-270° | | | | |
| 270°-330° | $1^{st}$ | $3^{rd}$ | $1^{st}$ and $3^{rd}$ | 13 |
| 330°-390° | | | | |
| 390°-450° | | | | |
| 450°-510° | | | | |
| 510°-570° | $2^{nd}$ | $1^{st}$ | $1^{st}$ and $2^{nd}$ | 12 |
| 570°-630° | $2^{nd}$ | $3^{rd}$ | $2^{nd}$ and $3^{rd}$ | 23 |
| 630°-690° | | | | |
| 690°-750° | | | | |
| 750°-810° | | | | |
| 810°-870° | $3^{rd}$ | $1^{st}$ | $1^{st}$ and $3^{rd}$ | 13 |
| 870°-930° | | | | |
| 930°-990° | | | | |
| 990°-1050° | | | | |
| 1050°-1080° | $1^{st}$ | $2^{nd}$ | $1^{st}$ and $2^{nd}$ | 12 |

Every 540° all phases are once the source and once the sink. Further, all possible combination of phases occur once. However, if one is interested in the direction of the current, the period increases to 1080°: Only then does the combination of current-carrying conductors which includes the direction of the current repeat itself.

Figure 4:
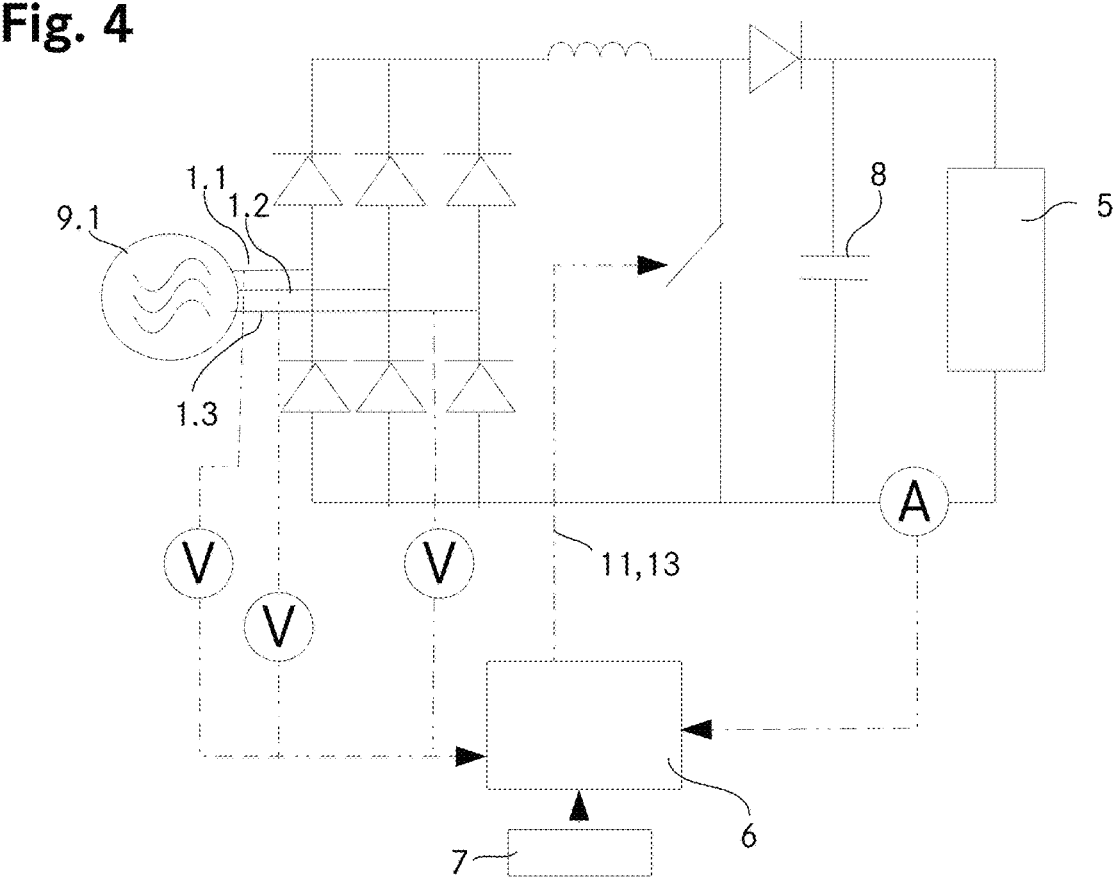
FIG. 4 Example of an AC/DC converter
FIG. 5 Example of an inverter
In the figures, the same components are given the same reference symbols.
Figure 5:
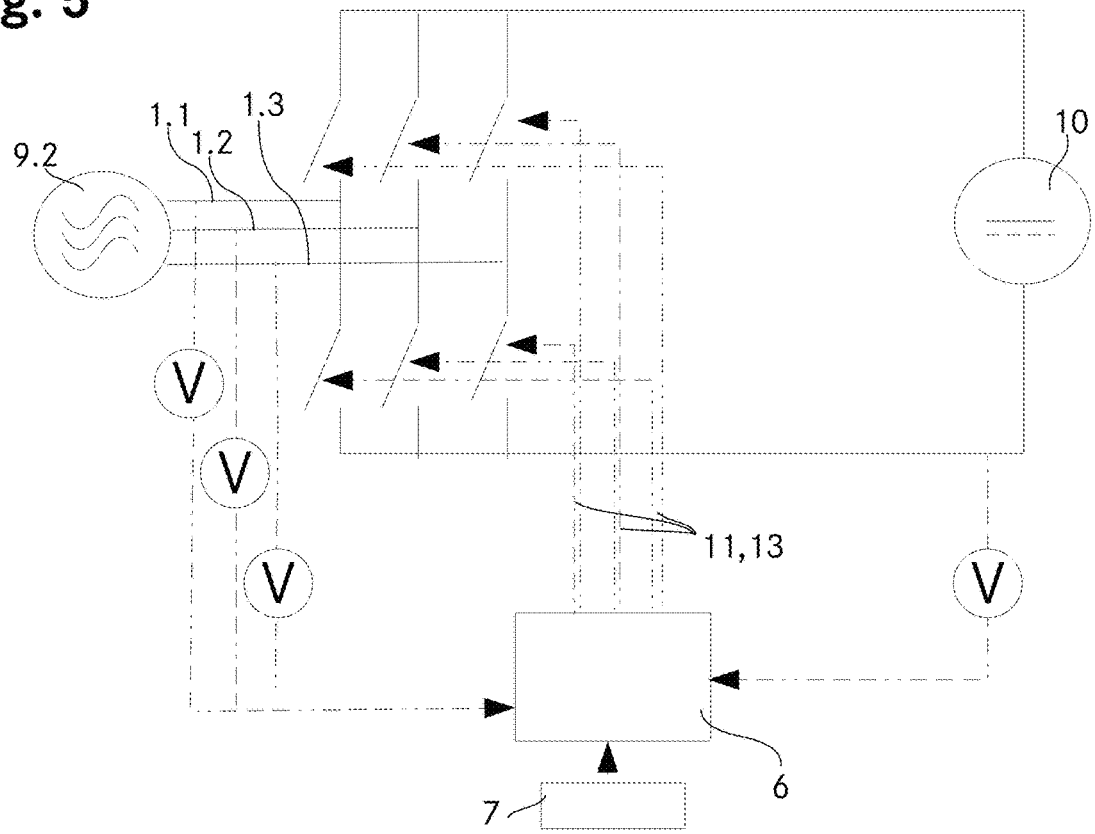

In FIGS. 4 and 5, electrical connections are drawn in solid lines while signal transmission are indicated by dashed-dotted lines. The direction in which a signal is transmitted is indicated by an arrow.

FIG. 4 shows a converter with a multiphase AC voltage input terminal 9.1. The converter is connected to a load 5. It comprises a bridge rectifier with three branches. Every branch comprises two diodes. Every phase 1.1, 1.2 and 1.3 which is connected at the multiphase AC voltage input terminal 9.1 is connected to a different one of the midpoints of the branches of the bridge rectifier. The branches are connected in parallel to the output of the bridge rectifier. A boost converter is connected to the output of the bridge rectifier. The boost converter comprises an inductivity, a diode, an output capacitor 8 and a controllable switch. A first input terminal of the boost converter is connected to one of the output terminals of the bridge rectifier. A second input terminal of the boost converter is connected to the other output terminal of the bridge rectifier. The inductivity is connected to the input terminal of the boost converter. Downstream of the inductivity is a first connection point. The controllable switch and the diode are connected to the first connection point. The diode is connected such that its conducting direction is the direction away from the first connection point. The switch is further connected to the second input terminal of the boost converter. The diode is further connected to a second connection point. This second connection point is further connected to the output capacitor 8 and to the first output terminal of the boost converter. The output capacitor 8 is further connected to the second input terminal of the boost converter. The second input terminal of the boost converter is connected to the second output terminal of the boost converter. The first and the second output terminal of the boost converter are connected to the load 5.

The converter comprises further measurement devices for measuring the voltages of the phases 1.1, 1.2 and 1.3 at the input terminal 9.1. Alternatively or in addition, the measurement devices could also be measuring the voltage in all the branches of the bridge rectifier. The measurement values are either transmitted to a control unit 6 or the measurement device is included in the control unit 6. Further, the power needed by the load 5 is measured. In the embodiment at hand, this is done by a measurement of the current drawn by the load 5. Also this measurement in transmitted to the control unit 6 or the current measurement is included in the control unit 6. There is further a memory which comprises the pattern 7 to be applied once the power needed by the load 5 falls below a predefined first power threshold. The pattern 7 can be transmitted to the control unit 6. It is also possible, that the pattern 7 is stored or calculated in the control unit 6 itself. The control unit 6 uses the current measurement to determine if the set value of the power needed by the load, which is the set value of the output power, is below the first power threshold or not. If the set value of the power needed by the load is above the first power threshold, the control unit produces a high frequency PWM signal with a given or defined duty cycle. This is the first switching signal 11 for the controllable switch of the boost converter. If the set value of the power needed by the load is below or exactly at the first power threshold, the control unit choses a suitable pattern 7. It uses the one or more voltage measurements to determine the point in time at which one of the bumps start and to determine the block length. With these information and the pattern, a blocking signal is produced: The blocking signals consists of intervals of 1 and 0, each interval having the length of one block length. The sequence of 1 and 0 is determined by the pattern. The pattern is repeated over and over again until the set value of the power needed, which is the set value of the output power, changes such that another pattern or no pattern is supposed to be applied. The blocking signal is multiplied to the high frequency PWM signal. The resulting switching signal is the pattern-determined switching signal 13 and it is transmitted to the switch which stays open while the pattern-determined switching signal 13 equals 0.

Keeping the controllable switch open for a time which is long compared to C*R will have the effect that the output voltage of the boost converter is essentially the same as its input voltage. C is the combined capacity of the output capacitor 8 and the internal capacitance of the load 5, L is here the inductance of the inductivity and R is the resistance of the load 5. The load 5 holds typically a much higher voltage as it is charged in the time where the boost converter has a much higher output voltage than its input voltage. As we assume a situation in which the load consumes only little power, it keeps a high voltage over its input terminals for a significant time. Consequently, there will be a significant time span in which the output voltage of the boost converter with constantly open switch, which is essentially equal to the input voltage of the boost converter, is smaller than the voltage over the input terminals of the load. Therefore there is no current flowing from the upstream side of the boost converter to its output and into the load. Therefore there is no power flow through the converter in this time interval. Once the voltage over the input terminals of the load is lower than the input voltage of the boost converter, the load will receive power and there is again a power flow through the converter. However, in most cases, the load will be such that the voltage over its input terminals stays higher than the input voltage of the boost converter. If the load itself cannot hold a voltage over its input terminals for a sufficient amount of time, a suitable capacitor can be connected in parallel to the load. Such a capacitor acts as reservoir and damper for the ripples caused by the blocking intervals. By applying a pattern with a constant or near constant number of blocking intervals following immediately on each other, the dimension of such a capacitor can be optimized.

FIG. 5 shows an inverter. It has a multiphase AC output terminal 9.2 which can be connected to a power grid. The phases 1.1, 1.2 and 1.3 are connected to the AC output terminal 9.2. Each one of them is also connected to a connection point between two controllable switches. There are three branches, connected in parallel, with each one carrying two controllable switches. A DC power source is connected between the two common points of the three branches.

There are further measurement devices, for example voltmeter, with which the power provided by the DC power source is evaluated and also the period of the AC voltages in the branches and the point in time at which a blocking interval should start if needed. The measurement results are either transmitted to a control unit 6 or measured directly inside the control unit 6. If the power provided by the DC power source is above a first power threshold, the switches in the branches are opened and closed in such a way that an AC voltage with the desired phase shift and frequency results. The switching signals necessary for this operation are produced by the control unit 6. If the power provided by the DC power source, this is the set value of the output power in this case, is below the first power threshold, a pattern 7 is applied to the switching signals: The knowledge about the frequency and the phase of the output voltage is used to produce a pattern-determined switching signal which is either 0 or 1 for a block length. The sequence of 0 and 1 blocks is determined by the pattern 7. The pattern 7 is repeated over and over again until the power provided by the DC power source fulfills the conditions for either the use of another pattern or for not applying any pattern at all. The pattern-determined switching signal is multiplied to all switching signals necessary to produce the desired output voltage. If the resulting switching signal is zero, the respective switches are opened. Consequently, there is no current and no power flow from the DC power source to the AC multiphase output terminal 9.2 during this time.

In summary, it is to be noted that some of the suggested measurements can be replaced by other means to obtain the necessary information. For example a user may chose and enter the frequency of the AC multiphase output voltage and the converter can be programmed or constructed to choose the phase angle of 0° to be at the beginning of the operation or at another event. Also the set value of the power can be defined by a user input or by some sort of signal generated by the load and transmitted to the control unit by any common signal transmission means like radio waves or cables. The pattern can be predefined and saved on a computer readable medium but it can also be calculated by the control unit or by another computing device every time it is needed or it can be set by a user input. It is also possible that only the subpattern are saved and the arrangement into a pattern is done by a random or programmed process. The arrangement of the switches and the design of the inverter, the rectifier and the boost converter are for illustrative purposes. Any other inverter design, rectifier and converter can be used. If this design does not include a switch suitable for the inventive method, a controllable switch can be placed in the input or in the output terminal of the complete converter and this switch can be controlled by the pattern-controlled switching signal alone.

Most examples are with three phases. However, one can extend the method to systems with more than three phases.

LIST OF REFERENCE SYMBOLS

| | |
|---|---|
| 1.1, 1.2, 1.3 | Phases of AC input voltage |
| 2.21, 2.13, 2.32 | Voltage difference between phases 1.2 and 1.1; 1.1 and 1.3; 1.3 and 1.2 |
| 3 | Combined voltage function $V_{tot}(t)$ |
| 3.1 | Maxima of the combined voltage function $V_{tot}(t)$ |
| 3.2 | Minima of the combined voltage function $V_{tot}(t)$ |
| 4 | bump |
| 4.1 | Bump length |
| 5 | Load ("R") |
| 6 | Control unit |
| 7 | Pattern |
| 8 | Output capacitor |
| 9.1, 9.2 | Multiphase AC voltage input; Multiphase AC voltage output |
| 10 | DC power source |
| 11 | First switching signal |
| 12 | Pattern-signal |
| 13 | pattern-determined switching signal |
| 14 | Voltage over the input terminals of the load |
| 15.1, 15.2, 15.3 | Current in $1^{st}$ phase, current in $2^{nd}$ phase, current in $3^{rd}$ phase |

The invention claimed is:

1. A method for providing an output power of a switched mode power converter with a multiphase AC side having a number N of conductors for receiving a multiphase AC voltage, wherein the number N of conductors is at least three and wherein a power flows into the switched mode power converter through a combination of current-carrying conductors comprising the steps of:
   a. determining a block length which is defined by a time span between two subsequent changes of the combination of the current-carrying conductors, and
   b. if a set value of the output power is below a first power threshold, preventing a power flow through the converter in each period of the multiphase AC voltage for at least one blocking interval, wherein each blocking interval has a duration of one block length.

2. Method according to claim 1, wherein the block length is determined by dividing a duration of the period of the multiphase AC voltage by a bump-number C, wherein the bump-number C is a number of changes of the combination of the current-carrying conductors which occur during one period of the multiphase AC voltage while the set value of the output power is above the first power threshold.

3. Method according to claim 1, wherein every blocking interval starts at a point in time at which the change of the combination of the current-carrying conductors occurs.

4. Method according to claim 1, wherein each blocking interval starts at a point in time at which a combined voltage function, crosses a voltage threshold in a predefined direction, wherein the combined voltage function is a largest absolute value of a voltage between any two conductors which are connected with each other during at least one phase angle interval if the set value of the output power is above the first power threshold.

5. Method according to claim 1, wherein
   c) there is a second power threshold which is lower than the first power threshold and
   d) wherein the method comprises the following steps:
      i) if the set value of the output power is below the second power threshold, choosing a number of blocking intervals per period of the multiphase AC voltage to be greater than the number of blocking intervals per period of the multiphase AC voltage in a case where the set value of the output power is between the second and the first power threshold and ii) choosing the number of blocking intervals per period of the multiphase AC voltage to be zero if the set value of the output power is above the first power threshold iii) preferably, choosing the number of blocking intervals per period of the multiphase AC voltage to be two if the set value of the output power is below the second power threshold and choosing the number of blocking intervals per period of the multiphase AC voltage to be one if the set value of the output power is between the second power threshold and the first power threshold.

6. Method according to claim 1, wherein the first power threshold is set to (C−1)/C times a maximum power transmittable with a given connection of the conductors, with C being the bump number and wherein preferably the second power threshold is set to (C−2)/C times the maximum power transmittable with a given connection of the conductors.

7. Method according to claim 1, wherein c) all conductors of the multiphase AC side are connected to phases of the multiphase AC voltage such that a polygon connection results and d) the method comprises the step of choosing i) a phase difference multiple k out of integers between and including one and an integer quotient of (M/2), with M being a number of phases of the multiphase AC voltage, and ii) the number of blocking intervals per period of the multiphase AC voltage q out of integers between and including zero and C−1, with C being the bump number, such that the set value of the output power is as close as possible below a maximum power transmittable by a single phase of the multiphase AC voltage times 2 sin (k π/M) (1−q/c).

8. Method according to claim 1, comprising the step of c) Using a pattern repeatedly to determine the blocking intervals if the set value of the output power is below the first power threshold, d) wherein the pattern is a combination of one or more subpatterns and e) the subpattern is a sequence of Q and P elements, wherein a Q element indicates one blocking interval and a P element indicates the absence of one blocking interval, and wherein there are C/2 or C elements in a subpattern and wherein an order of the elements in the subpattern indicates distances between the blocking intervals and wherein C is the bump-number.

9. A method according to claim 8 wherein the pattern consists of one subpattern.

10. A method according to claim 8, wherein the pattern consists of an integer multiple of E!/(X!*(EX)!) different subpatterns which have all the same number of Q and P elements, wherein X is the number of Q-elements per subpattern and E is a number of elements in a subpattern and wherein all of the different subpatterns occur equally often in the pattern.

11. A method according to claim 1, wherein a first switching signal is determined from a voltage potential of at least one conductor connected to one phase of the multiphase AC voltage and the set value of the output power.

12. A method according to claim 11, wherein a pattern-determined switching signal is constructed by multiplying a pattern-signal representing the pattern with the first switching signal wherein c) the pattern is a combination of one or more subpatterns and d) the subpattern is a sequence of Q and P elements, wherein a Q element indicates one blocking interval and a P element indicates the absence of one blocking interval, and wherein there are C/2 or C elements in a subpattern and wherein an order of the elements in the subpattern indicates distances between the blocking intervals and wherein C is the bump-number, and e) the first switching signal is a PWM signal and f) wherein the pattern-signal is series of 0 and 1, wherein i. every Q-element is replaced by 0 for the duration of one block length and ii. every P-element is replaced by 1 for the duration of one block length and g) wherein a pattern-determined switching signal of 0 keeps the switch in a position that prevents the power flow through the switched mode power converter.

13. Controller for carrying out the method according to claim 1.

14. Switched mode power converter, which uses the method according to claim 1, comprising c) an AC multiphase terminal, preferably an input terminal, with terminals for at least two phases and a neutral or at least three phases, d) at least one controllable switch and e) a controller which controls the at least one controllable switch such that the method according to claim 1 is executed.

15. Switched mode power converter according to claim 14 further comprising f) an AC/DC converter, preferably a full bridge rectifier or a Vienna rectifier, g) voltage or current detection means to detect the voltage or the current in at least one conductor connected to one phase of the multiphase AC voltage and h) a DC/DC converter, preferably a boost or a buck converter, comprising the at least one controllable switch.

16. Inverter for a solar inverter that uses a method according to claim 1 comprising c) a DC input, d) the multiphase AC side as an output, with terminals for at least two phases of the multiphase AC voltage and a neutral or at least three phases of the AC multiphase voltage otherwise and e) a DC/AC converter, preferably in a full bridge configuration, comprising at least one controllable switch per conductor connected to one of the phases of the AC multiphase voltage, and f) the controller which controls the controllable switches in order to execute the method according to claim 1.

* * * * *